Patented June 28, 1932

1,865,164

UNITED STATES PATENT OFFICE

LOUIS BERMAN, OF NEW YORK, N. Y.

METHOD OF PREPARING PARATHYRIN

No Drawing.   Application filed June 21, 1927. Serial No. 200,510.

The present invention relates to a new and improved method of preparing parathyrin which is a new parathyroid product described in my prior applications Serial No. 712,552, filed May 12, 1924; Serial No. 715,057, filed May 22, 1924; Serial No. 49,643, filed August 11, 1925, now Patent No. 1,680,660, granted August 14, 1928; and Serial No. 74,648, filed December 10, 1925.

The present invention provides a new and improved process of making the new parathyroid product, which I call parathyrin, by coagulating the protein of the glands as a first step in the procedure and thereafter obtaining the parathyrin in a substantially pure crystalline form from an extract of the protein coagulated glands. By removing the protein at an early stage of the procedure, larger yields of the parathyroid product are obtainable from the same quantity of glands, and the production of the new product is otherwise improved.

The following example is illustrative of the method of this invention:

A quantity of parathyroid glands freed from fat is pounded in a mortar with about one-fifth its weight of pure bichloride of mercury, which is a solid coagulant, in order to coagulate the protein material present. The resulting mixture is extracted, for example, in a revolving shaking machine, with a solution which is weakly acid and which may advantageously contain an organic solvent. I have found that a solution of 85–90% ethyl alcohol containing about 5% of sulfuric acid by volume gives satisfactory results. The extract is filtered and the filtrate neutralized with caustic soda or other suitable agent, causing the precipitation of most of the mercury and protein present. The precipitate is filtered off and the solution is then treated to remove any mercury which it may still contain. Mercury may be removed by first adding hydrochloric acid to produce slight acidity and then precipitating the mercury by passing hydrogen sulfide into the solution. The precipitate is filtered off and the solution neutralized, as with caustic soda, and the residual hydrogen sulfide is then boiled off.

This solution which contains the active parathyroid product is evaporated to dryness preferably by distilling off the alcohol and then evaporating the aqueous solution in a vacuum evaporator. The resulting dry material which generally contains crystals is further purified by redissolving in alcohol which may be 85–90% ethyl alcohol. 80% alcohol has proved satisfactory, although a somewhat stronger alcohol solution has been found better for production purposes. The alcohol solution is filtered. The solution is then brought to dryness preferably by distilling off the alcohol and evaporating the aqueous solution in a vacuum evaporator. This process of solution in alcohol followed by filtration and crystallization is repeated several times until pure white crystals with constant properties are obtained.

The crystalline material is a very powerful parathyroid product. I have found that a few milligrams cause a rise of from four to five milligrams of calcium per 100 cc. of blood in normal animals such as cats or dogs. The crystalline product protects parathyroidectomized animals against tetany.

The process of this invention, which provides for coagulation of protein material as a primary step in the operation, has been found advantageous as it gives larger yields of the parathyrin than were possible by prior methods, which omit the coagulating step. The coagulated glands are extracted with an acid solution, and the parathyrin is recovered from the resulting extract in a substantially pure condition.

By adding water or Ringer's solution or physiological salt solution, the dry product may be dissolved to form a solution suitable for injection. It is administered parenterally, desirably by intramuscular, subcutaneous, or intravenous injection; and acts to increase the calcium content of the blood in either normal or parathyroidectomized animals, to decrease the electrical irritability of the nerves, and to relieve symptoms of tetany. The dose used depends on the weight of the person or animal being treated, the amount of rise desired in the blood calcium, and the stage of purification to which the process of preparation of the product has been carried. The dose is calibrated by tests made on animals, usually dogs.

I claim:

1. A method of preparing a parathyroid product which comprises treating the glands with bichloride of mercury, extracting the bichloride treated glands with an acidulated alcohol solution, removing mercury from the solution and then crystallizing the parathyroid product from solution.

2. A method of preparing a parathyroid product which comprises treating the glands with bichloride of mercury, extracting the bichloride treated glands with an acidulated alcohol solution, filtering, neutralizing, filtering, acidifying, treating with hydrogen sulfide, filtering, neutralizing, boiling to remove the residual hydrogen sulfide, distilling off the alcohol, filtering, evaporating to dryness, dissolving in alcohol, filtering, boiling off the alcohol, evaporating to dryness, and repeating the crystallization steps until a substantially pure product is obtained.

In testimony whereof I affix my signature.

LOUIS BERMAN.